(12) United States Patent
Smeyers et al.

(10) Patent No.: US 9,254,879 B2
(45) Date of Patent: Feb. 9, 2016

(54) FORMED AUTOMOTIVE PART MADE FROM AN ALUMINIUM ALLOY PRODUCT AND METHOD OF ITS MANUFACTURE

(75) Inventors: Axel Alexander Maria Smeyers, Heist op den Berg (BE); Sunil Khosla, Beverwijk (NL); Bruno Schepers, Brasschaat (BE); Alastair Wise, Santpoort-Noord (NL)

(73) Assignee: ALERIS ALUMINUM DUFFEL BVBA, Duffel (BE)

( * ) Notice: Subject to any disclaimer, the term of this patent is extended or adjusted under 35 U.S.C. 154(b) by 500 days.

(21) Appl. No.: 13/879,901

(22) PCT Filed: Oct. 28, 2011

(86) PCT No.: PCT/EP2011/068953
§ 371 (c)(1),
(2), (4) Date: May 3, 2013

(87) PCT Pub. No.: WO2012/059419
PCT Pub. Date: May 10, 2012

(65) Prior Publication Data
US 2013/0228252 A1 Sep. 5, 2013

(30) Foreign Application Priority Data
Nov. 5, 2010 (EP) .................................... 10190119

(51) Int. Cl.
*B62D 65/02* (2006.01)
*C22F 1/053* (2006.01)
*C22C 21/10* (2006.01)

(52) U.S. Cl.
CPC ................ *B62D 65/02* (2013.01); *C22C 21/10* (2013.01); *C22F 1/053* (2013.01); *Y10T 29/49826* (2015.01)

(58) Field of Classification Search
CPC .............................. B62D 65/02; C22F 1/053
USPC ......................................... 148/537, 688, 702
See application file for complete search history.

(56) References Cited

U.S. PATENT DOCUMENTS

| 3,135,633 | A | 6/1964 | Hornus |
| 3,332,773 | A | 7/1967 | Dudas et al. |
| 5,718,780 | A | 2/1998 | Bryant et al. |
| 5,728,241 | A | 3/1998 | Gupta et al. |
| 6,342,111 | B1 | 1/2002 | Meki et al. |
| 6,848,233 | B1 | 2/2005 | Haszler et al. |
| 2013/0034744 | A1 | 2/2013 | Anderson et al. |

FOREIGN PATENT DOCUMENTS

| EP | 1081242 A1 | 3/2001 |
| EP | 1638715 B1 | 12/2007 |
| FR | 2341661 A1 | 9/1977 |
| JP | 60-194041 A | 10/1985 |
| WO | 9514113 A1 | 5/1995 |
| WO | 9607768 A | 3/1996 |
| WO | 9722724 A1 | 6/1997 |
| WO | 0026020 A1 | 5/2000 |
| WO | 2004112992 A2 | 12/2004 |
| WO | 2010049445 A1 | 5/2010 |

OTHER PUBLICATIONS

International Preliminary Report on Patentability of May 7, 2013 for application No. PCT/EP2011/068953 filed Oct. 28, 2011.
"International alloy designations and chemical composition limits for wrought aluminium and wrought aluminium alloys", Registration Record Series, Aluminum Association, Washington, DC, US, Jan. 1, 2004, pp. 1-26, XP002903949.
International Search Report mailed Nov. 23, 2011 for International Patent Application No. PCT/EP2011/068953 having an International filing date of Oct. 28, 2011.

*Primary Examiner* — Brian Walck
(74) *Attorney, Agent, or Firm* — Novak Druce Connolly Bove + Quigg LLP

(57) ABSTRACT

An aluminum alloy rolled sheet product for forming into automotive body panels, and having a yield strength of more than 160 MPa after being subjected to a paint-bake cycle, and having a gauge in a range of 0.5 to 4 mm, and preferably 0.7 to 3.5 mm, and having a composition of, in wt. %: Zn 1.5 to 4.0, Mg 0.3 to 1.5, Cu 0 to 1.0, Ti 0 to 0.15, Fe 0 to 0.35, Si 0 to 0.5, other elements and unavoidable impurities, and balance aluminum. An automotive body part formed from such an aluminum sheet. A method of manufacturing an automotive body part. Also, the use of the aluminum alloy sheet product in such a method of manufacturing.

25 Claims, No Drawings

FORMED AUTOMOTIVE PART MADE FROM AN ALUMINIUM ALLOY PRODUCT AND METHOD OF ITS MANUFACTURE

CROSS-REFERENCE TO RELATED APPLICATIONS

This is a §371 National Stage Application of International Application No. PCT/EP2011/068953 filed on 28 Oct. 2011, claiming the priority of European Patent Application No. 10190119.7 filed on 5 Nov. 2010.

FIELD OF THE INVENTION

The invention relates to an aluminium alloy sheet product suitable for forming into an automotive body part such as a door panel, hood or a trunk lid panel. The invention further relates to an automotive body part, to a method of manufacturing an automotive body part, and to the use of the aluminium alloy sheet product in such a method of manufacturing.

BACKGROUND TO THE INVENTION

As will be appreciated herein below, except as otherwise indicated, aluminium alloy designations and temper designations refer to the Aluminum Association designations in Aluminum Standards and Data and the Registration Records, as published by the Aluminum Association in 2010.

For any description of alloy compositions or preferred alloy compositions, all references to percentages are by weight percent unless otherwise indicated.

Heat-treatable AlMgSi alloys of the AA6000-type series are being used widely for automotive body parts in which, besides good formability of the aluminium sheet, the strength after undergoing a paint bake cycle plays an important role. The requirements imposed on the aluminium sheet used for the automotive body parts include good formability, a low and stable yield point, a high surface quality including amongst others that no stretcher strains are present following shaping or deforming the sheet into a bodywork panel. Conventionally, such aluminium sheet is manufactured by casting an ingot, homogenisation and/or pre-heating, hot rolling, cold rolling to final thickness, followed by solution heat treatment and quenching from solution heat treatment temperature so as to cool to below 150° C. using a high cooling rate. Following the cooling the aluminium sheet is then aged, in particular by natural ageing, to obtain the desired level of properties. For use in the automotive industry the aluminium sheet, following shaping by for example pressing or deep drawing, is provided with one or more paint layers. Such a paint layer is fast cured by maintaining it for some time at elevated temperature. Such a treatment is in the art designated by the terms "paint-bake" or "paint-baking", and going through such a treatment is designated in the art by the term "paint-bake cycle". A typical paint-bake cycle comprises of one or more sequential short heat treatment in the range of up to 200° C. for a period of 10 to less than 40 minutes, and typically of less than 30 minutes. In dependence of the OEM such a paint bake cycle may comprise of 2 to 5 sequential steps and includes drying steps.

Artificial ageing of the AA6000-series aluminium sheet and curing of the paint layer usually largely coincide. The trend among automotive manufactures is to reduce the time and temperature of the paint-bake, for example to 15 to 30 minutes at about 160° C. to 190° C., due to the need for energy saving. Several proposals have been made for a preliminary ageing treatment or pre-age treatment to improve the properties of the sheet following the paint-bake. Such a pre-age treatment is carried out after quenching from solution heat treatment and before any substantial age hardening has taken place, and whereby the pre-age treatment is carried out prior to a forming operation (e.g. stamping, deep drawing) in order to increase the so-called paint bake response, the latter being a significant strengthening of the alloy sheet during the automotive paint bake cycle. The application of a pre-age treatment enhances the kinetics of precipitation and decreases the precipitate size. Examples of such pre-age treatments are disclosed in the patent documents WO-95/14113, WO-96/07768, WO-97/022724, and U.S. Pat. No. 3,135,633.

However, there is an ongoing trend among automotive manufactures (OEM's) to further reduce the temperatures used in the paint-bake cycle resulting in that the currently used 6000-series alloys do not achieve the required strength levels after the paint-bake cycle, even not when the known pre-ageing treatments have been applied. Hence, the methods of manufacturing automotive body parts needs to be further altered in order to achieve the desired strength levels in the aluminium alloy product after a paint-bake cycle.

SUMMARY OF THE INVENTION

It is an object of the present invention to provide a formable aluminium alloy sheet product suitable for automotive body parts and capable of achieving a yield strength of at least 160 MPa after being subjected to a paint-bake cycle.

It is another object of the present invention to provide a formable aluminium alloy sheet product suitable for automotive body parts and capable of achieving a yield strength of at least 160 MPa after being subjected to a paint-bake cycle having a maximum temperature of less than 140° C.

It is another object of the invention to provide a method of manufacturing a formed body part of an automobile and having after the paint bake cycle a yield strength of at least 160 MPa.

These and other objects and further advantages are met or exceeded by the present invention providing an aluminium alloy rolled sheet product having a yield strength of more than 160 MPa and having a gauge in a range of 0.5 to 4 mm, and preferably 0.7 to 3.5 mm, and having a composition comprising of, in wt. %:

| | |
|---|---|
| Zn | 1.5 to 4.0 |
| Mg | 0.3 to 1.5 |
| Cu | 0 to 1.0 |
| Ti | 0 to 0.15 |
| Fe | 0 to 0.35 |
| Si | 0 to 0.5, | other elements and unavoidable impurities, each maximum 0.05%, total 0.2%, and with optionally (at most about 0.05% Ca, at most about 0.05% Sr, at most about 0.004% Be), and balance aluminium.

In accordance with the invention it has been found that sheet products within this compositional range having excellent press formability and provide for a yield strength of at least 160 MPa, and preferably of at least 200 MPa, after being subjected to a paintbake cycle, in particular to a paint bake cycle in the temperatures applied to cure any paint layer applied is not more than 140° C., or even not more than about 130° C.

The aluminium sheet product can be formed (e.g. by means of stamping, deep drawing, pressing, press forming, and roll forming, either at ambient or at elevated temperature) into automotive body parts, in particular to closures like door inner panels, door outer panels, side panels, inner hoods, outer hoods, and trunk lid panels.

The yield strength of the aluminium sheet at the moment for forming into a body panel is preferably not more than about 280 MPa, and more preferably not more than 250 MPa. In dependence of the complexity of the formed automotive panel made from the aluminium sheet product, the yield strength could be very low, for example in a range of about 80 to 120 MPa, or it should be at a higher level, for example of at least 160 MPa.

The aluminium sheet alloy may further comprises one or more elements selected from the group consisting of (Zr 0.04 to 0.25, Cr 0.04 to 0.25, Mn 0.10 to 0.50) as purposive alloying elements for grain structure control of the microstructure in the sheet product.

In an embodiment the aluminium alloy sheet has a Zr-content in the range of 0.04% to 0.25%, and preferably of about 0.07% to 0.2%, and may optionally contain one or two elements selected from the group consisting of Mn of 0.10% to 0.50% and Cr of 0.04% to 0.25%.

In another embodiment where there is a purposive addition of Zr then each of Mn and Cr are at a level of maximum 0.05%, and preferably each is present at an impurity level, which in practical terms would mean that the Mn and Cr content is at regular impurity levels of <0.05%, and preferably <0.02%, and more preferably the alloy is essentially free or substantially free from Cr and Mn. With "substantially free" or "essentially free" we mean that no purposeful addition of these elements was made to the composition, but that due to impurities and/or leaching from contact with manufacturing equipment, trace quantities of these elements may, nevertheless, find their way into the final alloy product. Preferably the alloy product is also essentially free of scandium, cobalt and hafnium.

In an embodiment the aluminium alloy sheet comprises, in wt. %,

| | |
|---|---|
| Zn | 1.5 to 4.0 |
| Mg | 0.3 to 1.5, preferably 0.3 to 1.0, |
| Cu | 0 to 1.0 |
| Mn | 0 to 0.15, preferably 0 to 0.05, |
| | either 0.04 to 0.25 Zr or 0.04 to 0.25 Cr, |
| Ti | 0 to 0.15 |
| Fe | 0 to 0.35 |
| Si | 0 to 0.5, | other elements and unavoidable impurities, each maximum 0.05%, total 0.20%, balance aluminium.

The Zn content in the aluminium alloy sheet is preferably not more than about 3.8%, preferably not more than about 3.5%, and more preferably not more than about 3.2%, to provide the desired strength and formability levels. Following the paint-bake cycle the alloy product may increase somewhat in strength due to a natural ageing effect.

The Mg content in the aluminium alloy sheet is preferably at least about 0.4%, and more preferably at least about 0.45%, to provide sufficient strength and formability to the sheet product.

The Mg content is less than 1.5%, and more preferably not more than 1.0%, and more preferably not more than 0.9%. A too high Mg content has an adverse effect on the elongation of the alloy product and thereby limiting the formability capability of the sheet product into automotive body parts.

The Cu content in the aluminium sheet product can be up to about 1.0% to provide additional strength to the product. In those applications of the alloy product where corrosion performance is an important engineering parameter it is preferred to maintain the Cu level low, and preferably less than about 0.2%, and more preferably less than 0.10%, and most preferably it is less than 0.04%.

Aluminium alloys of the 7xxx-series are well known for their use in aerospace application where there is a very strict control of the upper-limits for the Fe- and the Si-contents to maintain high levels of damage tolerance properties, such as toughness. However, it has been found that according to this invention the Fe and Si levels are less critical and the upper-limits can be raised to 0.35% and 0.5% respectively.

Ti can be added to the alloy product amongst others for grain refiner purposes during casting of the alloy stock, e.g. ingots or billets. The addition of Ti should not exceed about 0.15%, and preferably it should not exceed about 0.1%. A preferred lower limit for the Ti addition is about 0.01%. Ti can be added as a sole element or with either boron or carbon serving as a casting aid for grain size control.

Traditionally, beryllium additions have served as a deoxidizer and/or ingot cracking deterrent and may be used in the alloy product according to this invention. Though for environmental, health and safety reasons, more preferred embodiments of this invention are substantially Be-free. Minor amounts of Ca and Sr alone or in combination can be added to the alloy product for the same purposes as Be. Preferred addition of Ca is in a range of about 10 to 100 ppm.

The balance in the aluminium alloy product is made by aluminium and normal and/or inevitable incidental elements and impurities. Typically such elements or impurities are present at a level of 0.05% maximum, and a total of 0.2% maximum.

In an embodiment of the aluminium alloy sheet product, it has a composition consisting of, in wt. %:

| | |
|---|---|
| Zn | 1.5 to 4.0, preferably 1.5 to 3.5, |
| Mg | 0.3 to 1.5, preferably 0.3 to 0.9, |
| Cu | 0 to 1.0, preferably less than 0.10, |
| Mn | 0 to 0.15, preferably 0 to 0.05, |
| Zr | 0 to 0.25, preferably 0.04 to 0.25 Zr, |
| Ti | 0 to 0.15 |
| Fe | 0 to 0.35 |
| Si | 0 to 0.5, | other elements and unavoidable impurities, each maximum 0.05%, total 0.20%, balance aluminium.

In an embodiment the aluminium alloy sheet product has been provided with a metal clad layer applied on at least one side to form a composite sheet product, wherein the metal clad layer material has an inner-surface and an outer-surface and wherein the inner-surface is facing the Al—Zn sheet product of this invention.

The clad layer material can be made from an AA3000, AA4000-, AA5000-, AA6000-, or a different AA7000-series aluminium alloy compared to the core alloy.

Although the dimensions of the aluminium composite material can be varied in many ways for use as automotive body sheet it is made from the aluminium alloy sheet product according to this invention and having a thickness in the range of 0.5 to 4 mm, preferably 0.5 to 3.5 mm, and more preferably of about 0.7 to 1.5 mm. The clad layer or clad layers are usually much thinner than the core sheet, and each clad layer constituting about 1% to 25% of the total composite sheet thickness. A clad layer more typically constitutes around about 1% to 14% of the total composite sheet thickness.

In an embodiment the aluminium alloy sheet product is clad on at least one side with an aluminium alloy from the AA5xxx-series having less than 3.6% of Mg, amongst others to obtain a good intergranular corrosion resistance. Particularly suitable alloys are chosen from the AA5005, AA5754, AA5051A, AA5052, AA5252, AA5352, or AA5018-series aluminium alloys.

In another embodiment the aluminium alloy sheet product is clad on at least one of said faces with a low alloyed AA6000-series aluminium alloy having less than 0.25% Cu, preferably less than 0.2% Cu, and preferably an AA6000-series alloy having a substantially balanced Mg$_2$Si composition to improve the bendability, the hemming performance and the crash performance of the clad sheet product according to this invention.

A preferred aluminium alloy as a clad layer has a chemical composition consisting of, in wt. %:

| | |
|---|---|
| Si | 0.4 to 0.9 |
| Mg | 0.4 to 0.8, |
| Fe | <0.35 |
| Cu | <0.25, preferably <0.2, and more preferably <0.1, |
| Mn | <0.5 |
| Cr | <0.3 |
| Zr | <0.3 |
| Zn | <0.3, preferably <0.1, |
| Ti | <0.1, | impurities each <0.05, total 0.15, balance aluminium.

A more preferred choice is the AA6005 alloy, and more in particular the AA6005A-series alloy, for both alloys with the proviso that the Cu-content is <0.25%, and preferably <0.2%. For the AA6005A alloy the sum of Mn+Cr is preferably less than 0.50%, and more preferably in a range of 0.1% to 0.50% for optimum hemming performance.

In another embodiment the AA6000-series alloy has a chemical composition of AA6016 or AA6016A-series aluminium alloys.

The sheet product in accordance with the present invention may comprise only one clad sheet applied to only one of the faces. In another embodiment a clad sheet is applied to both faces of the sheet product. As a result, a composite material is obtained which exhibits excellent balanced properties, viz. strength and formability versus corrosion performance, dent resistance and hemming performance.

Such a composite material can be manufactured via various techniques known in the art, and which includes roll bonding and casting techniques such as for example disclosed in European patent document EP-A-1638715.

In a further aspect of the invention there is provided a method of manufacturing an automotive body panel, comprising the steps of:
  providing a rolled aluminium sheet product having a chemical composition in accordance with this invention and having a gauge in a range of 0.5 to 4 mm, the yield strength of the aluminium sheet is preferably at least 160 MPa, and preferably less than 280 MPa,
  forming (e.g. by means of stamping, deep drawing, pressing, press forming, and roll forming, either at ambient or at elevated temperature) the aluminium alloy sheet to obtain a formed automotive panel, and in particular into a panel selected from the group of door inner panels, door outer panels, hoods, and trunk lids,
  assembling the formed automotive body panel with one or more other metal parts to form an assembly forming a motor vehicle component,
  subjecting said motor vehicle component to a paint-bake cycle to provide an automotive body panel having a yield strength of at least 160 MPa, preferably of at least 200 MPa. The paint-bake cycle is preferably having temperature cycles none of which exceeding 140° C., and more preferably none of which exceeding a temperature of about 130° C.

In accordance with the method of the invention automotive body panels are provided which are made from aluminium sheet having the required levels of formability and relatively low yield strength and which strength levels are maintained after being subjected to a paint-bake cycle having temperature cycles none of which exceed about 140° C. Favourably, the strength levels of the automotive body panel may even slightly increase as a consequence of the paint-bake cycle.

In an embodiment of the invention, the automotive body panel after forming and prior to subjecting the body panel to a paint bake cycle has been subjected to a pre-age treatment having at least one heating step in at a temperature between 65° C. and 210° C., and preferably in the range of 70° C. to 130° C. It has been found that such a pre-ageing treatment allows for the production of a stable high strength product resulting in only a limited strength increase over a longer period of time.

In an embodiment of manufacturing a formed automotive body panel the aluminium alloy sheet is solutionised, for example by passing it through a continuous annealing furnace using fast heat-up rates, cooled to ambient temperature, and then artificially aged to the target yield strength in the range of at least 160 MPa and preferably less than 250 MPa, whereby after the ageing the sheet product is formed in accordance with this invention, assembled and subjected to a paint-bake cycle. The sheet product prior to forming can be aged to an underaged T6 temper, e.g. T61, T64 or T65 according to EN515. In a preferred embodiment the sheet product prior to forming is aged to an over-aged T7x temper, for example a T79 temper. An advantage of using an over-aged temper is that during the paint-bake cycle there is no further over-ageing, in particular when the paint-bake cycle is carried out at temperatures of less than 140° C., resulting in that there is no significant loss of strength in the sheet product as a consequence of the paint-bake cycle. Consequently, following the paint-bake cycle the sheet product has reached substantially its favourable final strength levels of at least 160 MPa, and preferably of at least 200 MPa.

In an alternative embodiment of manufacturing formed automotive body panels the aluminium sheet is provided as a cold rolled sheet product or solutionised and/or artificial aged, whereafter the sheet product is brought to an elevated temperature such that it is placed in a phase field of the alloy where substantial strengthening may still be realised following a cooling operation, following such a solutionising heat-treatment (which can be carried out near of at the press shop with an OEM) resulting in excellent press formability behaviour the sheet product is formed in accordance with this invention, assembled and subjected to a paint-bake cycle delivering a yield strength of at least 160 MPa, and preferably of at least 200 MPa.

In another aspect of the invention it relates to the use of an aluminium alloy sheet in a formed automotive body panel, and having a gauge in a range of about 0.5 to 4 mm, preferably of about 0.7 to 3.5 mm, and having a chemical composition of, in weight percent, as set out in this description and set forth in the claims, and wherein the body panel has been formed (e.g. by means of stamping, deep drawing, pressing, press forming, and roll forming, either at ambient or at elevated temperature) and subjected to a paint-bake cycle, preferably to a paint-bake cycle having temperature cycles not exceeding 140° C., and more preferably not exceeding 130° C.

In another aspect of the invention it relates to a motor vehicle incorporating a formed aluminium alloy body panel in accordance with this invention. In particular it relates to closures selected from the group consisting of in door inner panels, door outer panels, side panels, inner hoods, outer hoods, and trunk lid panels.

The invention claimed is:

1. A method of manufacturing a formed aluminium alloy part of a motor vehicle, the method comprising:
   (a) providing a rolled aluminium sheet product having a chemical composition comprising, in wt. %:

|    |              |
   |----|--------------|
   | Zn | 1.5 to 4.0   |
   | Mg | 0.3 to 1.5   |
   | Cu | 0 to 1.0     |
   | Ti | 0 to 0.15    |
   | Fe | 0 to 0.35    |
   | Si | 0 to 0.5,    | other elements and unavoidable impurities, each maximum 0.05%, total 0.2%, and balance aluminium, and having a gauge in a range of about 0.5 to 4 mm, the aluminium sheet having a yield strength of at least 160 MPa;
   (b) forming the aluminium alloy sheet to obtain a formed automotive panel;
   (c) assembling the formed automotive body panel with one or more other metal parts to form an assembly forming a motor vehicle component; and
   (d) subjecting said motor vehicle component to a paint-bake cycle, wherein the formed automotive body panel has a yield strength of at least 160 MPa after being subjected to the paint-bake cycle.

2. Method according to claim 1, wherein the aluminium alloy comprises, in wt. %,

|    |                                          |
   |----|------------------------------------------|
   | Zn | 1.5 to 4.0                               |
   | Mg | 0.3 to 1.5                               |
   | Cu | 0 to 1.0                                 |
   | Mn | 0 to 0.15,                               |
   |    | either 0.04 to 0.25 Zr or 0.04 to 0.25 Cr, |
   | Ti | 0 to 0.15                                |
   | Fe | 0 to 0.35                                |
   | Si | 0 to 0.5,                                | other elements and unavoidable impurities, each maximum 0.05%, total 0.20%, balance aluminium.

3. Method according to claim 1, wherein the Zn-content of the aluminium alloy is less than 3.8%.

4. Method according to claim 1, wherein the Mg-content of the aluminium is at least 0.4%.

5. Method according to claim 1, wherein the Mg-content of the aluminium alloy is less than 1.0%.

6. Method according to claim 1, wherein the Cu-content of the aluminium alloy is less than 0.2%.

7. Method according to claim 1, wherein the rolled aluminium sheet product has a metal clad layer on at least one side.

8. Method according to claim 1, wherein the paint-bake cycle is carried out at temperatures not exceeding 140° C.

9. Method according to claim 1, wherein the formed automotive panel has been subjected to a pre-age treatment prior to the paint-bake cycle.

10. Method according to claim 9, wherein the formed automotive panel has been subjected to a pre-age treatment in a temperature range of 65° C. to 210° C. prior to the paint-bake cycle.

11. Method according to claim 9, wherein the formed automotive panel has been subjected to a pre-age treatment in a temperature range of 70° C. to 130° C. prior to the paint-bake cycle.

12. Method according to claim 1, wherein the paint-bake cycle is carried out a temperatures not exceeding 130° C.

13. Method according to claim 1, wherein the Zn-content of the aluminium alloy is less than 3.5%.

14. Method according to claim 1, wherein the Mg-content of the aluminium is at least 0.45%.

15. Method according to claim 1, wherein the Cu-content of the aluminium alloy is less than 0.10%.

16. Method according to claim 1, wherein the aluminium alloy consists of, in wt. %,

|    |             |
   |----|-------------|
   | Zn | 1.5 to 4.0  |
   | Mg | 0.3 to 1.5  |
   | Cu | 0 to 1.0    |
   | Mn | 0 to 0.15   |
   | Zr | 0.04 to 0.25 |
   | Ti | 0 to 0.15   |
   | Fe | 0 to 0.35   |
   | Si | 0 to 0.5,   | other elements and unavoidable impurities, each maximum 0.05%, total 0.20%, balance aluminium.

17. Method according to claim 1, wherein the automotive panel is a closure.

18. Method according to claim 1, wherein the automotive panel is a closure selected from the group of door inner panel, door outer panel, side panel, inner hood, outer hood, and trunk lid panel.

19. Method according to claim 1, wherein following step (d) the formed part has a yield strength of at least 200 MPa after being subjected to the paint-bake cycle.

20. Method according to claim 1, wherein the rolled aluminium sheet product of step (a) has been artificially aged to an underaged T6 temper to a yield strength of at least 160 MPa.

21. Method according to claim 1, wherein the rolled aluminium sheet product of step (a) has been artificially aged to an underaged T6 temper to a yield strength of at least 160 MPa to less than 250 MPa.

22. Method according to claim 1, wherein the rolled aluminium sheet product of step (a) has been artificially aged to an overaged T7x-temper to a yield strength of at least 160 MPa.

23. Method according to claim 1, wherein the rolled aluminium sheet product of step (a) has been artificially aged to an overaged T7x-temper to a yield strength of at least 160 MPa to less than 250 MPa.

24. Method according to claim 1, wherein the yield strength of the rolled aluminium sheet product of step (a) has of at least 160 MPa and less than 280 MPa.

25. Method according to claim 1, wherein the rolled aluminium sheet product chemical composition further comprises one or more elements selected from the group consisting of Zr 0.04 to 0.25, Cr 0.04 to 0.25, and Mn 0.10 to 0.50.

* * * * *